United States Patent
Fukuta et al.

[11] Patent Number: 5,791,960
[45] Date of Patent: Aug. 11, 1998

[54] DISPLAY DEVICE AND FABRICATION METHOD THEREFOR

[75] Inventors: Shinya Fukuta; Shigeo Kasahara, both of Kawasaki, Japan

[73] Assignee: Fujitsu Ltd., Kawasaki, Japan

[21] Appl. No.: 755,658

[22] Filed: Nov. 25, 1996

[30] Foreign Application Priority Data

Jul. 10, 1996 [JP] Japan .................. 8-180704

[51] Int. Cl.$^6$ .................................. H01J 9/02
[52] U.S. Cl. .............................. 445/24; 445/58
[58] Field of Search .................. 445/24, 58, 50

[56] References Cited

U.S. PATENT DOCUMENTS

5,576,225 11/1996 Zhang et al. ................ 438/587 X

Primary Examiner—Kenneth J. Ramsey
Attorney, Agent, or Firm—Staas & Halsey

[57] ABSTRACT

A method for fabrication of a display device is provided which comprises the steps of: forming an aluminum electrode having a predetermined configuration on a substrate; and treating the aluminum electrode with a solution containing an oxidizing agent to form on a surface of the aluminum electrode a compound film containing as a principal component a substance derived from the solution containing the oxidizing agent.

11 Claims, 5 Drawing Sheets

DISPLAY DEVICE AND FABRICATION METHOD THEREFOR

BACKGROUND OF THE INVENTION

1. Field of the Invention

The present invention relates to a display device and a fabrication method therefor. More particularly, the invention relates to a method for forming a compound film on aluminum electrodes of a display device such as a plasma display panel or a liquid crystal display device for protecting the aluminum electrodes from corrosion and the like, and to a display device fabricated by the method.

2. Related Art

Hitherto known as display devices are liquid crystal display devices, CRTs, plasma display panels (hereinafter referred to as "PDPs") and the like. Among these display devices, the PDPs which have a smaller thickness than CRTs offer installation flexibility. The construction of an exemplary PDP will hereinafter be described.

Figure 4:
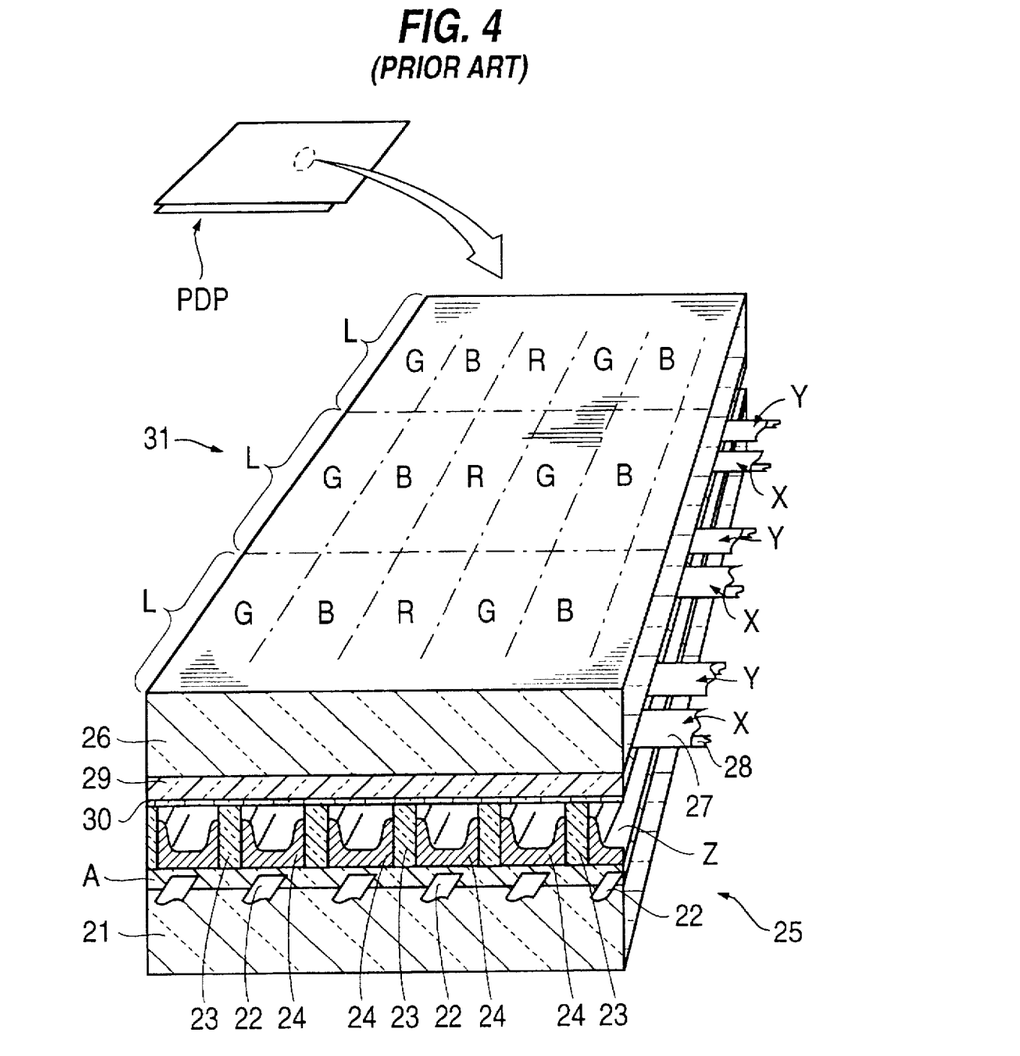
FIG. 4 is a schematic perspective view illustrating a prior-art PDP.

FIG. 4 is a schematic perspective view of an AC-driven surface discharge PDP. A pair of sustain electrodes (also referred to as "device electrodes") X and Y are formed for each matrix display line L on an interior surface of a front glass substrate 26. The sustain electrodes X and Y each include a transparent electrode 27 and a metal electrode (bus electrode) 28, and are covered with a dielectric layer 29 for AC driving. A protective film 30 of MgO is formed on a surface of the dielectric layer 29 by vapor deposition.

Provided on an interior surface of a rear glass substrate 21 are address electrodes 22, a dielectric layer A, barrier ribs 23 and fluorescent layers 24 of three colors (R, G, B). The barrier ribs 23 each have a linear configuration in plan. The barrier ribs 23 define the discharge space Z as having a predetermined gap, and partition a discharge space Z along a line of the matrix display to define respective subpixels. Each pixel (picture element) for display comprises three subpixels arranged along the line. The subpixel is the discharge cell, where sustain electrodes X and Y intersect an address electrode 22. In the PDP, the barrier ribs 23 are arranged in a so-called stripe pattern and, therefore, the subpixels in each row in the discharge space Z are arranged in sequence across all the lines L. The subpixels in each row are adapted to emit the same color light. Reference numerals 25 and 31 denote a rear substrate and a front substrate, respectively.

FIGS. 5(a) to 5(g) and 6(a) to 6(g) are sectional views for explaining a method for fabricating the PDP shown in FIG. 4. More specifically, FIGS. 5(a) to 5(g) illustrate a method for making the rear substrate, and FIGS. 6(a) to 6(g) illustrate a method for making the front substrate.

Figure 5A:
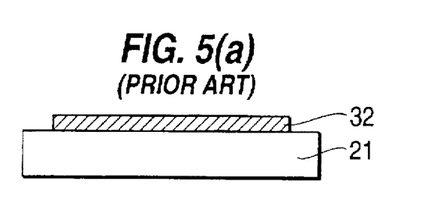
Figure 5B:
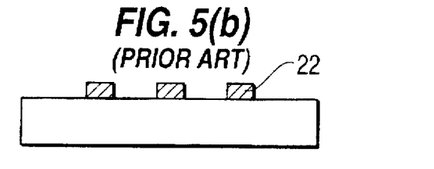

The method for making the rear substrate will first be described.

After a glass substrate 21 is cleaned, a metal layer 32 is formed of copper, aluminum or the like on the glass substrate 21 by vacuum evaporation or sputtering (see FIG. 5(a)). The metal layer is formed into address electrodes 22 by the photolithographic method (see FIG. 5(b)).

Figure 5C:
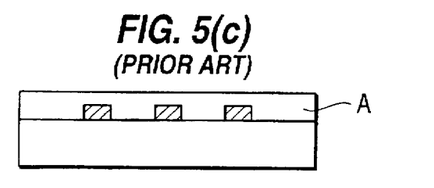

A low melting point glass is applied onto the resulting substrate by screen printing, and then baked for formation of a dielectric layer A (see FIG. 5(c)).

Figure 5D:
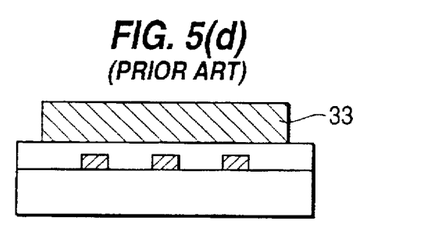

A barrier rib material layer 33 is formed of a low melting point glass by screen printing, and then dried (see FIG. 5(d)). A mask is formed of a photoresist or the like on the resulting substrate, and then a portion of the barrier rib material layer 33 not covered with the mask is removed by sandblasting.

Figure 5E:
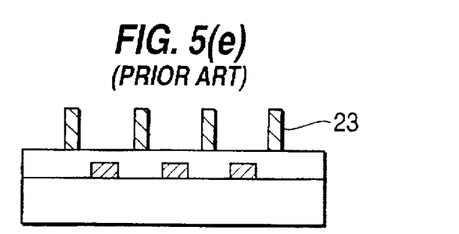
Figure 5F:
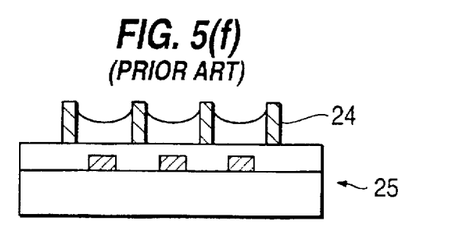

Thereafter, the resulting substrate is baked for formation of barrier ribs 23 (see FIG. 5(e)).

Fluorescent layers are formed between the barrier ribs 23 by screen printing. Thus, the rear substrate 25 is completed (see FIG. 5(f)).

Figure 5G:
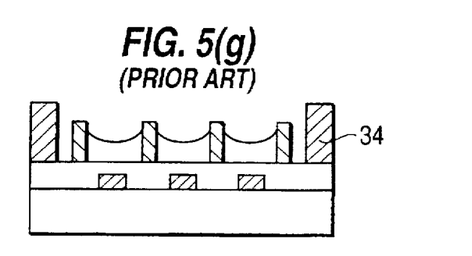

Subsequently, a sealing material is applied on a periphery of the glass substrate 21 and then baked for formation of a sealing member 34 (FIG. 5(g)).

Figure 6:
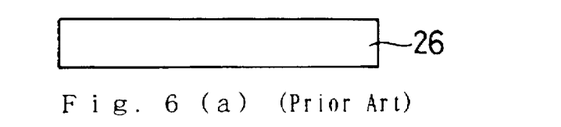

The method for making the front substrate will next be described.

After a glass substrate 26 is cleaned, a transparent conductive film 35 is formed on the glass substrate 26 by sputtering, CVD (chemical vapor deposition), or screen printing (see FIGS. 6(a) and 6(b)).

The transparent conductive film 35 is formed into transparent electrodes 27 each having a predetermined configuration by photolithography (see FIG. 6(c)).

A metal layer 36 is formed on the transparent electrode 27 by vacuum evaporation or sputtering (see FIG. 6(d)), and formed into bus electrodes 28 each having a predetermined configuration by photolithography (see FIG. 6(e)). The bus electrodes 28 serve to reduce the interconnection resistance of the transparent electrodes 27.

A low melting point glass is applied onto the resulting substrate by screen printing, and then baked for formation of a dielectric layer 29 (see FIG. 6(f)).

Thereafter, a protective film 30 of magnesium oxide or the like is formed on the dielectric layer 29 by vacuum evaporation or the like to improve the discharge characteristics of the PDP (see FIG. 6(g)). Thus, the front substrate 31 is completed.

The front substrate 25 and the rear substrate 31 thus fabricated are joined together with the address electrodes 22 arranged perpendicular to the bus electrodes 28. A space defined by the front and rear substrate structures is evacuated, and filled with a discharge gas. Thus, the PDP shown in FIG. 4 is completed. Typically used as the discharge gas is a mixture of rare gases.

In the PDP, the bus electrodes and the address electrodes are each formed of aluminum or comprised of three metal layers of chromium-copper-chromium. The electrodes formed of aluminum present the following three problems.

A first problem is that aluminum diffuses into the low melting point glass when an organic binder contained in the low melting point glass is burned out for removal thereof and the low melting point glass is baked (or once melted) at a softening point thereof (typically not lower than 400°C.) during the process for the formation of the dielectric layer, whereby the aluminum electrodes are eroded. The erosion of the aluminum electrodes results in a loss of metallic luster, so that the illumination from the fluorescent layers cannot efficiently be reflected.

A second problem is a reduction in the transmittance of the sustain electrodes. More specifically, the bus electrodes react with the transparent electrodes during the baking process for the formation of the dielectric layer, so that the transparent electrodes grow black. This leads to a reduction in the transmittance of the sustain electrodes, thereby reducing the illumination efficiency of the PDP. Although transparent electrodes of a NESA film do not suffer from the blacking, the blacking of transparent electrodes of an ITO (indium tin oxide) film is not negligible.

A third problem is that the aluminum electrodes are deformed at the baking of the low melting point glass. The deformation is caused due to grain recrystallization growth in the aluminum electrodes. The recrystallization growth occurs even at a temperature of not higher than a melting point of aluminum. The deformation of the aluminum electrodes starts at the surfaces thereof. When the deformation of the aluminum electrodes reaches the surface of the glass substrate, the deformation is visibly recognized, whereby the display quality of the PDP is degraded. Further, the recrystallization growth may cause stress migration to crack the aluminum electrodes, resulting in breakage thereof.

To solve these problems, there have been proposed a method for forming an aluminum oxide film on the surfaces of the aluminum electrodes by anodizing or thermal oxidation, and a method for coating the surfaces of the aluminum electrodes with a material such as aluminum oxide or silicon nitride having a low diffusion coefficient and a high blocking effect by a film formation process such as sputtering or CVD which is typically employed in the fabrication of semiconductor devices (Japanese Unexamined Patent Publications No. 52-70751 (1987) and No. 53-136957 (1988)).

These methods are characterized in that the surfaces of the aluminum electrodes are coated with an insulating film which does not melt at the baking temperature of the low melting point glass. The aforesaid three problems can be solved by the formation of the insulating film.

However, the aforesaid anodizing process involves a complicated process in which a voltage is applied to each of the electrodes to individually oxidize the surfaces of the electrodes, and takes several minutes to one hour for the application of the voltage, requiring increased costs.

The thermal oxidation process does not involve the application of a voltage, but takes a longer process time than the anodizing process.

Further, the aforesaid film formation processes such as sputtering and CVD which are typically used in the fabrication of semiconductor devices require expensive equipment.

That is, the aforesaid methods require increased process time and/or costs. Therefore, it has been desired to reduce the process time and costs. These problems are associated not only with the PDP but also with an active matrix liquid crystal display device in which signal lines (bus lines) and gate electrodes of thin film transistors (TFTs) for driving liquid crystal cells are formed of aluminum.

SUMMARY OF THE INVENTION

In accordance with a first aspect of the present invention, there is provided a method for fabrication of a display device, comprising the steps of: forming an aluminum electrode having a predetermined configuration on a substrate; and treating the aluminum electrode with a solution containing an oxidizing agent to form on a surface of the aluminum electrode a compound film containing as a principal component a substance derived from the solution containing the oxidizing agent.

In accordance with a second aspect of the present invention, there is provided a method for fabrication of a plasma display panel, comprising the steps of: forming an aluminum electrode having a predetermined configuration on a substrate; treating the aluminum electrode with a solution containing an oxidizing agent to form on a surface of the aluminum electrode a compound film containing as a principal component a substance derived from the solution containing the oxidizing agent; and forming a dielectric layer on the resulting substrate including the aluminum electrode.

In accordance with a third aspect of the present invention, there is provided a method for fabrication of a plasma display panel, comprising the steps of: forming on a substrate a display electrode of a multi-layer structure including a transparent electrode of a transparent conductive film having a predetermined configuration and a bus electrode of aluminum having a smaller width than the transparent electrode; treating the bus electrode of aluminum with a solution containing an oxidizing agent to form on a surface of the bus electrode a compound film containing as a principal component a substance derived from the solution containing the oxidizing agent; and forming a dielectric layer on the resulting substrate including the display electrode.

In accordance with a fourth aspect of the present invention, there is provided an AC-driven plasma display panel comprising: aluminum electrodes each having a predetermined configuration and formed on a substrate; and a dielectric layer covering the electrodes, wherein surfaces of the aluminum electrodes are each covered with a compound film formed by treating the aluminum electrodes with a solution containing an oxidizing agent, the compound film containing as a principal component a substance derived from the solution containing the oxidizing agent.

BRIEF DESCRIPTION OF THE DRAWINGS

FIGS. 5(a) to 5(g) are schematic sectional views for explaining a process for fabricating a rear substrate of the prior-art PDP; and FIGS. 6(a) to 6(g) are schematic sectional views for explaining a process for fabricating a front substrate of the prior-art PDP.

DESCRIPTION OF THE PREFERRED EMBODIMENTS

Display devices to be fabricated by the methods according to the present invention are those including aluminum electrodes. Examples thereof include PDPs and liquid crystal display devices, but not limited thereto.

Examples of the substrates to be used in the present invention include a glass substrate and a quartz substrate, but not limited thereto.

The aluminum electrodes each having a predetermined configuration are formed on the substrate. The formation of the aluminum electrodes may be achieved by any known method. For example, aluminum is deposited on the substrate by CVD, vacuum evaporation or sputtering, and then etched into the predetermined configuration by photolithography. When the display device is a PDP, the present invention is applied to the formation of bus electrodes and address electrodes thereof. Where the display device is a liquid crystal display device, the present invention is applied to the formation of gate electrodes of TFTs (for an active matrix liquid crystal display), or scanning electrodes and signal electrodes (for a simple matrix liquid crystal display device). The thickness of the aluminum electrodes is typically 5,000 Å to 40,000 Å for the bus electrodes in the PDP, 5,000 Å to 20,000 Å for the address electrodes in the PDP, and 500 Å to 3,000 Å for the gate electrodes of the TFTs in the active matrix liquid crystal display device and for the scanning electrodes and the signal electrodes in the simple matrix liquid crystal display device.

In accordance with the present invention, the aluminum electrodes are treated with a solution containing an oxidizing agent. By this treatment, the surfaces of the aluminum electrodes maybe covered with a compound film containing as a principal component a substance derived from the solution containing the oxidizing agent.

Any solutions known to be usable in a chemical film formation process can be used as the solution containing the oxidizing agent in accordance with the present invention. The oxidizing agent to be used is not particularly limited as long as it can form the compound film, but an inorganic oxidizing agent is typically used. Examples thereof include inorganic hexavalent chromic acid compounds such as $CrO_3$, $M_2Cr_2O_7$ and $M_2CrO_4$ (wherein M is a hydrogen atom or an alkaline metal), $HNO_3$ and $KNO_3$. An acid such as HF, HCN, $H_3PO_4$ or $HBF_4$ and a compound affording $Zn^{2+}$ ions maybe preferably added to the solution. The acids such as HF may serve to remove a natural oxide film formed on an aluminum surface and to adjust the pH of the solution to a level suitable for the formation of the compound film on the surface. The $Zn^{2+}$ and $PO_4^{3-}$ ions may serve as components of the compound film. Exemplary combinations of specific ions to be contained in the solution include: $CrO_4^{2-}$ and $F^-$; $CrO_4^{2-}$, $F^-$ and $CN^-$; $Zn^{2+}$, $PO_4^{3-}$, $NO_3^-$ and $BF_4^-$; and $PO_4^{3-}$, $CrO_4^{2-}$ and $F^-$. Among these, a combination of $CrO_4^{2-}$ and $F^-$ is particularly preferred. The solution containing the aforesaid oxidizing agent is usually an aqueous solution. An organic solvent is added to the aqueous solution, as required.

The treatment with the solution may be performed by immersion or spraying. The treatment conditions vary depending on the oxidizing agent to be used but, typically, a treatment temperature of about 25° C. (room temperature) to about 70° C., preferably 30° C. to 50° C. and a treatment period of several seconds to 5 minutes, preferably 30 seconds to 2 minutes may be employed.

By the treatment with the solution, the natural oxide film maybe removed from the surfaces of the aluminum electrodes, which are then formed with the compound film containing as a principal component a substance derived from the solution containing the oxidizing agent. The thickness of the compound film may vary depending on the oxidizing agent to be used and the treatment conditions, but typically 0.1 μm to several micrometers, preferably 0.2 μm to 0.5 μm.

Examples of specific substances derived from the solution containing the oxidizing agent to be contained in the compound film include inorganic compounds of trivalent chromium such as $Cr_2O_3$, $CrPO_4$ and $Cr(OH)_3$, $HCrO_4$. Other exemplary substances to be contained in the compound film include $Zn_3(PO_4)_2$ and $AlPO_4$, which depend on the type of the solution to be used for the treatment. It should be noted that the term "principal component" is herein defined as a component which is contained in the compound film in an greater amount than any other components contained therein. Since the formation of the compound film on the aluminum electrodes may be achieved by immersion or spraying, the time required for the treatment can be reduced.

In addition, the formation of the compound film may prevent the corrosion of the aluminum electrodes, and improve the thermal resistance of the aluminum electrodes. Where the transparent electrodes are formed on the aluminum electrodes, the reaction between the aluminum electrodes and the transparent electrodes can be suppressed. Aluminum oxide may be contained in the compound film in a proportion not hindering the effects of the present invention.

Where the compound film contains an inorganic trivalent chromium compound as a principal component, the use of an aqueous solution of ammonium cerium (IV) nitrate allows for selective removal of the compound film without etching aluminum.

After the formation of the compound film, the compound film is preferably subjected to a pore filling treatment by immersion in a solution containing a water glass or the like.

In a further preferred embodiment, the aforesaid aluminum surface treatment may be performed before the aluminum film is patterned into a predetermined configuration after the deposition of aluminum. Thus, the aluminum film intrinsically having a soft surface will be covered with a harder film, so that the aluminum surface can be protected from scratches which may otherwise be produced during the fabrication process. Therefore, the formation of hillocks due to stresses concentrated on the scratches can be prevented.

Although the foregoing description is directed to a case where the aluminum electrodes are formed directly on the substrate, the methods according to the present invention may be applied to a case where electrodes of two or more layers such as comprising a chromium layer and an ITO layer formed under an aluminum layer may be employed.

The steps following the aforesaid process may vary depending on the type of a display device to be fabricated. For example, the aforesaid AC-driven surface discharge PDP typically includes a rear substrate and a front substrate.

For fabrication of the rear substrate, aluminum electrodes (address electrodes) and a compound film are formed on a substrate in the aforesaid manner. Then, a dielectric layer is formed of a low melting point glass to a thickness of 5 μm to 30 μm over the entire surface of the resulting substrate. Further, barrier ribs are formed on the dielectric layer. The barrier rib formation method is not particularly limited, but any known method may be employed for the formation of the barrier ribs. For example, the formation of the barrier ribs can be achieved by applying a barrier rib material (e.g., a low melting point glass) onto the dielectric layer, removing a predetermined portion of the applied barrier rib material by sandblasting or the like, and baking the residual portion of the barrier rib material. Thereafter, fluorescent layers can be formed between the barrier ribs. Thus, the rear substrate is completed.

For fabrication of the front substrate, transparent electrodes each having a predetermined configuration are formed on a substrate. In turn, aluminum electrodes (bus electrodes) and a compound film are formed on the transparent electrodes. Thus, sustain electrodes are completed. Further, a dielectric layer is formed on the surface of the resulting substrate. The formation of the dielectric layer is achieved in the same manner as for the rear substrate structure. Then, a protective film (such as of magnesium oxide) is formed on the resulting substrate. Thus, the front substrate can be completed.

The rear substrate and the front substrate thus fabricated are joined together with the address electrodes arranged perpendicular to the sustain electrodes, and the periphery of the substrates is sealed. Thus, the PDP can be completed.

In addition to the fabrication of the aforesaid tri-electrode surface discharge PDP, this method can be applied to fabrication of a di-electrode opposed discharge PDP in which display electrodes X are disposed perpendicular to display electrodes Y with intervention of a discharge space. In such a case, the display electrodes X and Y are formed of aluminum.

For fabrication of an active matrix liquid crystal display device which employs TFTs as liquid crystal cell driving elements, the method according to the present invention can be used for formation of gate electrodes of aluminum for the TFTs For formation of TFTs of a inverted staggered type, for example, a gate insulating film and an amorphous silicon layer (serving as channels) are formed in this order on the gate electrodes formed of aluminum on a substrate. Then, source/drain electrodes are formed on the amorphous silicon layer. Thus, the TFTs are completed. The gate insulating film is typically formed of silicon nitride, silicon oxide or the like by a plasma CVD method. In general, the plasma CVD method is performed at a temperature of about 350° C. which is high enough to deform the aluminum gate electrodes to produce hillocks. The production of the hillocks may cause short-circuits between the gate electrodes and the source/drain electrodes. However, the hillocks produced on the gate electrodes are suppressed by the method according to the present invention because a compound film formed on surfaces thereof prevents the deformation of the gate electrodes, so that the short-circuits can be prevented. Further, the method according to the present invention can be applied to formation of TFTs each including a channel of a polysilicon layer as well as to formation of scanning signal lines and data signal lines connecting to the source electrodes and the drain electrodes, respectively, of the TFTs.

Although the foregoing description is directed to the fabrication of the active matrix liquid crystal display device, the present invention can be applied to a simple matrix liquid crystal display device including scanning electrodes and signal electrodes formed of aluminum.

The aluminum electrodes covered with the compound film formed by the method according to the present invention are free from the diffusion of aluminum, the electrochemical reaction of aluminum with the transparent electrodes and the deformation due to the aluminum grain growth, which are problems experienced by the prior art, because the compound film serves as the barrier in various aspects.

The suppression of the diffusion of aluminum is achieved because aluminum is prevented from moving into the insulating film by the compound film. The aluminum grain growth also is suppressed.

Figure 1:
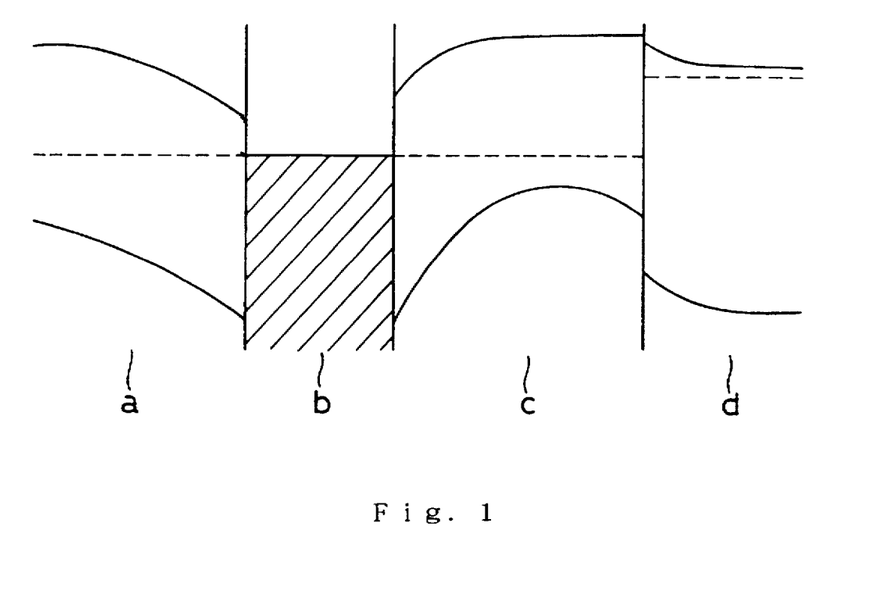
FIG. 1 is a diagram illustrating band gaps present in a front substrate of a PDP fabricated in accordance with the present invention.

A more specific explanation for the suppression of the electrochemical reaction is herein given by taking as an example a front substrate of a PDP which includes sustain electrodes of a two-layer structure each comprising an ITO transparent electrode and an aluminum electrode (bus electrode), a compound film of $Cr_2O_3$ formed on the aluminum electrode and a dielectric layer of PbO. FIG. 1 is a diagram illustrating band gaps present in the front substrate, in which reference characters a, b, c and d denote the transparent electrode, the aluminum electrode, the compound film and the dielectric layer, respectively. As shown in FIG. 1, the compound film c serving as a p-type semiconductor is formed with double barriers on the opposite sides thereof. The barriers prevent electrons from migrating to the aluminum electrode b. Thus, the aforesaid problems can be solved.

EXAMPLES

The present invention will hereinafter be described by way of examples in which the invention is applied to an AC-driven surface discharge PDP.

Example 1

A rear substrate of the PDP was fabricated in the following manner.

Figure 2:
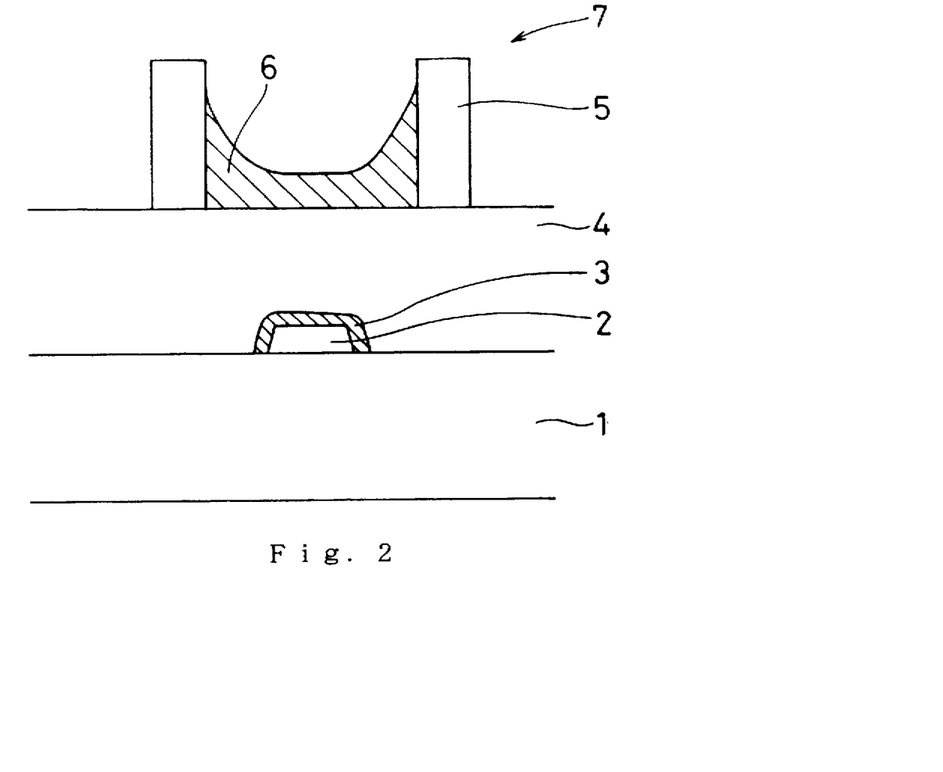
FIG. 2 is a schematic sectional view illustrating a rear substrate of a PDP fabricated in accordance with the present invention.

After a glass substrate 1 was cleaned, a 2 μm-thick metal layer of aluminum was formed on the glass substrate 1 by sputtering. The metal layer was formed into address electrodes (aluminum electrodes) 2 each having a predetermined configuration by photolithography. The address electrodes were subjected to a chemical film formation process in which the address electrodes were immersed in an aqueous solution of NEONIUM #CR2 available from Showa Chemical Industry Co. (containing 0.25 wt % of $H_2CrO_4$ and 0.15 wt % of HF) at 35° C. for one minute, and then rinsed with water. Thus, a 2,000 Å-thick compound film 3 containing $Cr_2O_3$ as a principal component was formed on surfaces of the address electrodes.

It is considered that reactions as represented by the following scheme occurred during the process for the formation of the compound film 3.

(1) Removal of natural oxide film ($Al_2O_3$) formed on surfaces of aluminum electrodes $Al_2O_3 + 6HF \rightarrow 2AlF_3 + 3H_2O$ (2) Formation of $Cr_2O_3$ on surfaces of aluminum electrodes $8H^+ + 2HCrO_4^- + 2Al \rightarrow 2Al^{3+} + Cr_2O_3 \cdot H_2O + 4H_2O$ (wherein $Al^{3+}$ ions form aluminum hydroxide and the like)

In turn, a low melting point glass was applied over the surface of the resulting substrate, then dried and baked. Thus, a 20 μm-thick dielectric layer 4 was formed.

A barrier rib material layer of a low melting point glass was formed on the dielectric layer by screen printing, and dried. Subsequently, a mask of a photoresist having openings corresponding to the barrier ribs to be formed was formed on the barrier rib material layer, and a portion of the barrier rib material layer not covered with the mask was removed by sandblasting. Then, the resulting substrate was baked. Thus, the barrier ribs 5 each having a height of 150 μm were formed.

Further, fluorescent layers 6 are formed between the barrier ribs 5 by screen printing. Thus, the rear substrate 7 shown in FIG. 2 was completed.

A front substrate was fabricated in the following manner.

Figure 3:
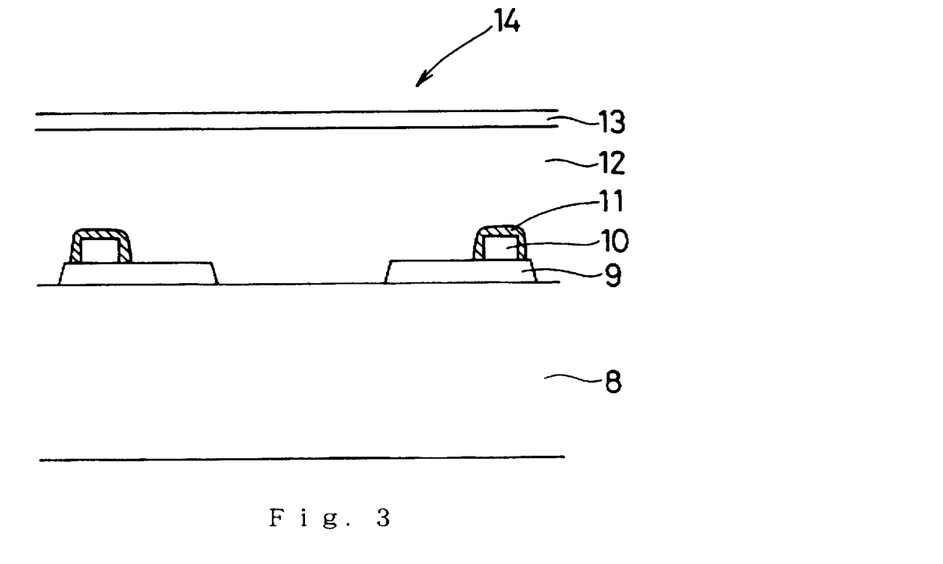
FIG. 3 is a schematic sectional view illustrating a front substrate of the PDP fabricated in accordance with the present invention.

After a glass substrate 8 was cleaned, an ITO film was formed on the glass substrate 8 by sputtering. Then, the ITO film was formed into transparent electrodes 9 for sustain electrodes each having a predetermined configuration by photolithography.

A metal layer of aluminum was formed on the transparent electrodes 9 by sputtering, and then formed into bus electrodes (aluminum electrodes) 10 each having a predetermined configuration by photolithography. The bus electrodes 10 served to reduce interconnection resistance of the transparent electrodes 9. The bus electrodes were subjected to a chemical conversion coating process in which the bus electrodes were immersed in an aqueous solution of NEONIUM #CR2 available from Showa Chemical Industry Co. (containing 0.25 wt % of $H_2CrO_4$ as an oxidizing agent and 0.15 wt % of HF) at 35° C. for one minute, and then rinsed with water. Thus, a 2,000 Å-thick compound film 11 (containing Cr$_2$O$_3$ as a principal component) was formed on surfaces of the bus electrodes. The compound film 11 was not formed on surfaces of the transparent electrodes, but selectively only on surfaces of the bus electrodes 10. The transparent electrodes were not etched by the solution containing the oxidizing agent.

In turn, a low melting point glass was applied on the resulting substrate by screen printing and baked for formation of a dielectric layer 12. Thereafter, a protective film 13 of magnesium oxide was formed on the dielectric layer 12 by vacuum evaporation. Thus, the front substrate 14 shown in FIG. 3 was completed.

The rear substrate 7 and the front substrate 14 thus fabricated were joined together with the address electrodes 2 arranged perpendicular to the sustain electrodes (the transparent electrodes 9 and the bus electrodes 10). A space defined between the rear substrate and the front substrate was evacuated, and filled with a discharge gas. Thus, the PDP was completed.

In this example, the bus electrodes and address electrodes formed of aluminum were free from the aluminum diffusion and the deformation due to the grain growth. Further, the transparent electrodes were free from the blacking due to a electrochemical reaction between the bus electrodes and transparent electrodes of the sustain electrodes.

Example 2

A PDP was fabricated in substantially the same manner as in Example 1, except that an aqueous solution containing 0.25 wt % of H$_2$CrO$_4$, 0.1 wt % of HF and 15 wt % of H$_4$[Fe(CN)$_6$] was used as the oxidizing-agent-containing solution and the chemical conversion coating process was performed by immersing the electrodes in the aqueous solution at 35° C. for one minute.

This example offered the same effects as in Example 1.

Example 3

A PDP was fabricated in substantially the same manner as in Example 1, except that an aqueous solution containing compounds affording 0.7 wt % of Zn$^{2+}$ ions, 1 wt % of PO$_4^{3-}$ ions, 2 wt % of NO$_3^-$ ions and 1 wt % of BF$_4^-$ ions was used as the oxidizing-agent-containing solution and the chemical conversion coating process was performed by immersing the electrodes in the aqueous solution at 60° C. for one minute.

This example offered the same effects as in Example 1.

Example 4

A PDP was fabricated in substantially the same manner as in Example 1, except that an aqueous solution containing compounds affording 15 wt % of PO$_4^{3-}$ ions, 0.1 wt % of CrO$_4^{2-}$ ions and 0.025 wt % of F$^-$ ions was used as the oxidizing-agent-containing solution and the chemical conversion coating process was performed by immersing the electrodes in the aqueous solution at 35° C. for one minute.

This example offered the same effects as in Example 1.

The method for formation of a display device in accordance with the present invention includes the steps of: forming aluminum electrodes each having a predetermined configuration on a substrate; and treating the aluminum electrodes with a solution containing an oxidizing agent to form on surfaces of the aluminum electrodes a compound film containing as a principal component a substance derived from the solution containing the oxidizing agent.

Therefore, the aluminum electrodes formed by the method according to the present invention are free from the problems of the prior art, i.e., the aluminum diffusion, the reaction with the transparent electrodes, and the deformation due to the grain growth. In addition, the time required for the treatment and the costs can be reduced.

What is claimed is:

1. A method for fabrication of a display device, comprising the steps of:

forming an aluminum electrode having a predetermined configuration on a substrate; and treating the aluminum electrode with a solution containing an oxidizing agent to form on a surface of the aluminum electrode a compound film containing as a principal component a substance derived from the solution containing the oxidizing agent.

2. A method as set forth in claim 1, wherein the solution contains an inorganic hexavalent chromium compound.

3. A method as set forth in claim 1, wherein the solution contains compounds affording Zn$^{2+}$ ions and PO$_4^{3+}$ ions.

4. A method as set forth in claim 1, wherein the compound film contains an inorganic trivalent chromium compound.

5. A method as set forth in claim 4, wherein the compound film contains Cr$_2$O$_3$, Cr(OH)$_2$, HCrO$_4$ or CrPO$_4$.

6. A method as set forth in claim 1, wherein the compound film contains Zn$_3$(PO$_4$)$_2$.

7. A method as set forth in claim 1, wherein the aluminum electrode is a gate electrode of a thin film transistor for driving a liquid crystal cell.

8. A method as set forth in claim 1, wherein the aluminum electrode is an electrode for driving a discharge cell.

9. A method for fabrication of a plasma display panel, comprising the steps of:

forming an aluminum electrode having a predetermined configuration on a substrate;

treating the aluminum electrode with a solution containing an oxidizing agent to form on a surface of the aluminum electrode a compound film containing as a principal component a substance derived from the solution containing the oxidizing agent; and forming a dielectric layer on the resulting substrate including the aluminum electrode.

10. A method for fabrication of a plasma display panel, comprising the steps of:

forming on a substrate a display electrode of a multi-layer structure including a transparent electrode of a transparent conductive film having a predetermined configuration and a bus electrode of aluminum having a smaller width than the transparent electrode;

treating the bus electrode of aluminum with a solution containing an oxidizing agent to form on a surface of the bus electrode a compound film containing as a principal component a substance derived from the solution containing the oxidizing agent; and forming a dielectric layer on the resulting substrate including the display electrode.

11. A method as set forth in claim 10, wherein the transparent electrode is formed of ITO.

* * * * *